W. GATERMANN.
SPRING FORK FOR BICYCLES AND THE LIKE.
APPLICATION FILED NOV. 25, 1911.

1,065,936.

Patented July 1, 1913.

Witnesses:

Inventor:

UNITED STATES PATENT OFFICE.

WILHELM GATERMANN, OF ALSUM, GERMANY.

SPRING-FORK FOR BICYCLES AND THE LIKE.

1,065,936.  Specification of Letters Patent.  Patented July 1, 1913.

Application filed November 25, 1911. Serial No. 662,438.

*To all whom it may concern:*

Be it known that I, WILHELM GATERMANN, a subject of the Emperor of Germany, and a resident of Alsum, Lower Rhine Province, Germany, have invented certain Improvements in Spring-Forks for Bicycles and the Like, of which the following is a specification.

The present invention relates to a spring fork for the front wheel of bicycles and the like and consists in the provision of T-shaped levers one of the short arms of which is rigidly connected to the wheel axle and the other hinged to the fork, the long arm having an upright position and being supported on the fork by means of a spring which thus controls the position of the elements and holds the wheel resiliently in the fork. The levers at the opposite sides of the wheel are interconnected by means of a shackle carried across the wheel-tire so as to form, together with the wheel axle, one rigid body which in no way impairs the stability of the machine or the free movement of the wheel.

Figure 1:
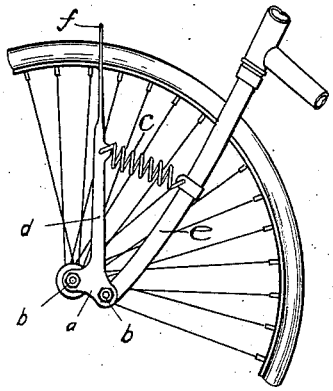
Figure 2:
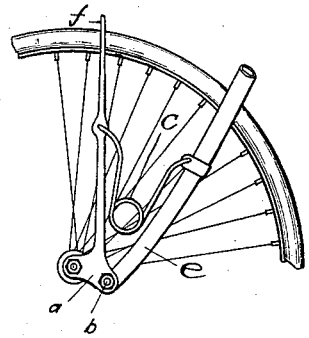
Figure 3:
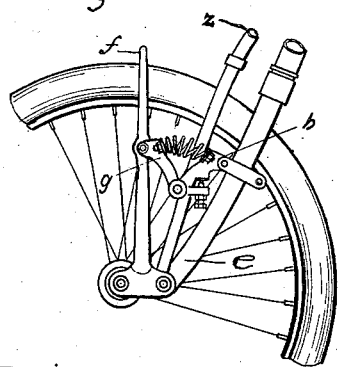
Figure 4:
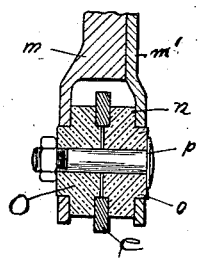
Figure 5:
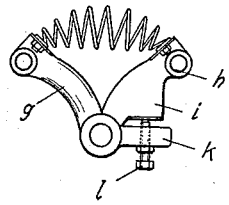
Figure 6:
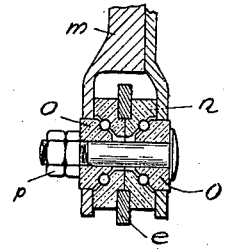

In the accompanying drawings the invention is illustrated, Figures 1 to 3 representing side views of the spring fork all fitted with differently constructed spring elements, Fig. 4, a view, on an enlarged scale, of the spring elements employed in Fig. 3, and Figs. 5 and 6, views showing various modes of connecting the levers to the fork.

According to the invention, the front fork $e$ of the machine is connected to the wheel axle through the medium of T-shaped levers $a$. Each of the latter has two short arms $b$ and a long arm $d$. One of the short arms is rigidly connected to the wheel axle, and the other is hingedly connected to one member of the wheel fork. The long arm $d$ has an upright position and is supported on the fork $e$ by means of a spring $c$ which thus controls the position of the wheel and absorbs all shocks sustained by the latter. The arms $d$ at the opposite sides of the wheel are interconnected by a shackle $f$ which is carried across the tire of the wheel.

The springs $c$ are preferably spiral-shaped, as shown in Figs. 1, 3 and 4, but other forms, for instance that shown in Fig. 2, may be employed with equal advantage. For ordinary bicycles the arrangements shown in Figs. 1 and 2 are preferably resorted to. For motor cycles it is advisable to provide means for adjusting the resiliency of the springs. Such an arrangement is shown in Fig. 3, where the spring $c$ is connected to the outer ends of two links $g$ and $h$ which are hingedly connected to one another, the link $g$ being moreover hinged with its outer end to the arm $d$ and the link $h$ to the fork $e$. The link $g$ has an arm $k$ which projects beyond the connecting point of said link with the link $h$, and the latter link has an abutment $i$ for the end of a screw $l$ fitted in the arm $k$. At the compression of the spring $c$, the links move so as to retract the screw $l$ from the abutment $i$. The return movement of the elements, and thus the reëxtension of the spring, is limited by the engagement of the screw with the abutment $i$, and it is evident, therefore, that the normal compression of the spring and the resiliency of the fork can be varied by adjusting the screw $l$ in the arm $k$.

$z$ in Fig. 3 indicates the stays with which the members of the fork $e$ are strengthened in known manner.

Particular attention should be paid to the connection of the fork $e$ with the arms $b$, since the stability of the arrangement is greatly affected thereby. Either of the arrangements shown in Figs. 5 and 6 are suitable for the purpose, particularly that of Fig. 5 in which a lateral yielding of the elements is entirely prevented. According to Fig. 5 the end $m$ of the arm $b$ is forked and adapted to hold two bushes $o$ rotatably between its members. These bushes are fitted with flanges $n$ which bear with their outer sides against the members of the fork $m$. Between the two flanges $n$ the wheel fork member $e$ is clamped when the bushes are connected by means of a screw-bolt $p$. The fork $m$ turns about the bushes $o$ during the vibrations of the wheel in the fork $e$. The wheel fork members $e$ are provided with apertures to admit the inner parts of the bushings $o$ and prevent displacement. Similar apertures are made in the members of the fork $m$ to receive the outer part of the bushings. The member $m^1$ of the fork $m$ is detachably secured to the arm to enable the different elements to be assembled.

The arrangement shown in Fig. 6 is similar to the one just described, the only difference being that the bushes $o$ are divided, each into two parts between which steel balls are introduced to reduce the friction. One part of each bush is formed into a ball-bearing cone and secured to the bolt $p$; the other is formed into a corresponding socket and clamped between the members of the fork $m$.

I claim:

1. In a spring fork for bicycles and the like, the combination with an ordinary fork, of T-shaped levers having one short arm rigidly connected to the wheel axle and another short arm pivoted to said fork, the long arms of the levers having an upright position, a shackle connecting said long arms over the wheel tire, links having their adjacent ends hingedly connected and their other ends pivoted, one to the long arm of one of said levers and the other to the adjacent fork member, a spring connecting these pivoted ends of the links, a projecting arm on one of the links, and an adjustable screw fitted in said arm so as to abut against the other link and limit the extension of the spring, substantially as and for the purpose set forth.

2. In a bicycle or the like, in combination with the wheel fork; pairs of bushings, each of the fork ends being clamped between the members of one pair; T-shaped levers, one on each side of the wheel, the long arms extending upwardly and connected one to the other across the top of the wheel, one of the short arms of each lever being pivotally supported on the wheel axle, the other short arms being forked at their extremities and rotatably supporting in these forked extremities the pairs of bushings and ends of the wheel fork; and springs connecting the long arms of the levers with the branches of the wheel fork.

WILHELM GATERMANN.

Witnesses:
WILHELM KOVENSCHEN,
JOHANN WELLNER.

---

Copies of this patent may be obtained for five cents each, by addressing the "Commissioner of Patents, Washington, D. C."